United States Patent [19]

Gerdes

[11] Patent Number: 4,899,482

[45] Date of Patent: Feb. 13, 1990

[54] MULTI-UTILITY FISHING TOOL

[75] Inventor: Connie D. Gerdes, Parker, Colo.

[73] Assignee: Barbco, Inc., Parker, Colo.

[21] Appl. No.: 385,360

[22] Filed: Jul. 27, 1989

[51] Int. Cl.$^4$ ............................................. A01K 97/00
[52] U.S. Cl. ............................................................ 43/4
[58] Field of Search ...................... 43/4, 535; 128/325, 128/326, 327

[56] References Cited

U.S. PATENT DOCUMENTS

| | | | |
|---|---|---|---|
| 1,053,149 | 2/1913 | Blunk | 43/535 |
| 3,631,707 | 1/1972 | Miller | 128/325 |
| 4,620,386 | 11/1986 | Hare | 43/4 |
| 4,686,983 | 8/1987 | Leisman et al. | 128/325 |

Primary Examiner—M. Jordan
Attorney, Agent, or Firm—Joseph C. Herring

[57] ABSTRACT

A modified hemostat adapted to be used as a multipurpose fishing tool has a clamping section, a fulcrum and handles. The clamping section has a first short space proximate to the tips and a longer space proximate to flat-shaped sections adjacent the fulcrum. The spaces are on the inner surface of the clamping section and are formed by cavities in the jaws. The jaws should be designed to be in substantial contact when the hemostat is in the closed position. The unit can also have crimpers, cutters and vices on its inner surfaces.

18 Claims, 4 Drawing Sheets

MULTI-UTILITY FISHING TOOL

SUMMARY OF THE PRIOR ART

Various types of fish hook extractors have been designed to remove fish hooks from fish and unintentionally hooked items, e.g., birds, animals and vegetation.

Typical extractors are designed around long-nosed scissors and "gun" models. Typical of plier designs are the extractors of U.S. Pat. Nos. 2,779,123 issued to F. E. White and 3,778,919 issued to J. O. Simon. Both designs have the plier jaws holding the hook barb to the side by, respectively, a groove arrangement and an anchoring plates and a groove arrangement.

A typical scissor arrangement is shown in U.S. Pat. No. 2,862,327 issued to Peter Steinhauser where the hook is held to the side by the clamping action of a "U" shaped tip against the other, longer tip. Typical "gun" type extractors are taught in U.S. Pat. Nos. 2,836,004, issued to Otto Stader and 3,675,359 issued to R. J. Young. The first of these is in the configuration of a pistol-type grip and holds the imbedded hook at an angle between toothed jaws. The other design basically utilizes a toothed long-nosed plier shape with an "L" shaped separation element made up of a segment while lies alongside the plier tips and a handle which is pulled toward the hand to force the "plier" nose away from the point at where the hook is imbedded and thereby pull the hook out of the material in which it is imbedded.

Various sizes and types of hemostats are known and the devices of this invention are modifications of the basic hemostat design but eliminate the aggravating ability of the hemostat to slip off a hook during the extraction process through the use of a hook retainer pin.

The multiple-use tool of this invention can be used for a variety of purposes, e.g., as a vice for fly tieing and line holding, as a hook extractor, a crimper, e.g. split shot and a cutter, e.g. line and the tips can be used as tweezers. Narrow tipped tools can also be utilized in untangling line. The tool allows the hook to rotate and thereby reduces the damage to the flesh or other material from which the hook is being extracted.

SUMMARY OF THE INVENTION

This multi-purpose tool for use with fishing activities uses modifications of the basic hemostat design with handles and a clamping section. The clamping section of the hemostat has two sets of jaws and spaces. The first space is short and adjacent the jaws at the tip. It is bridged by a hook retaining pin positioned intermediate the length of the space and perpendicular to the longitudinal midline of the hemostat. The second space is longer and rearward of the first space. These spaces are separated by a short, second clamping section.

A space for crimping split shot is formed adjacent to the hemostat's pivot section. A line cutter and/or line holding extension(s) is/are preferably placed between the handles of the hemostat rearward of the split shot crimping space. The line cutter can also be used to open split shot.

DETAILED DESCRIPTION OF THE DRAWINGS

Figure 1:
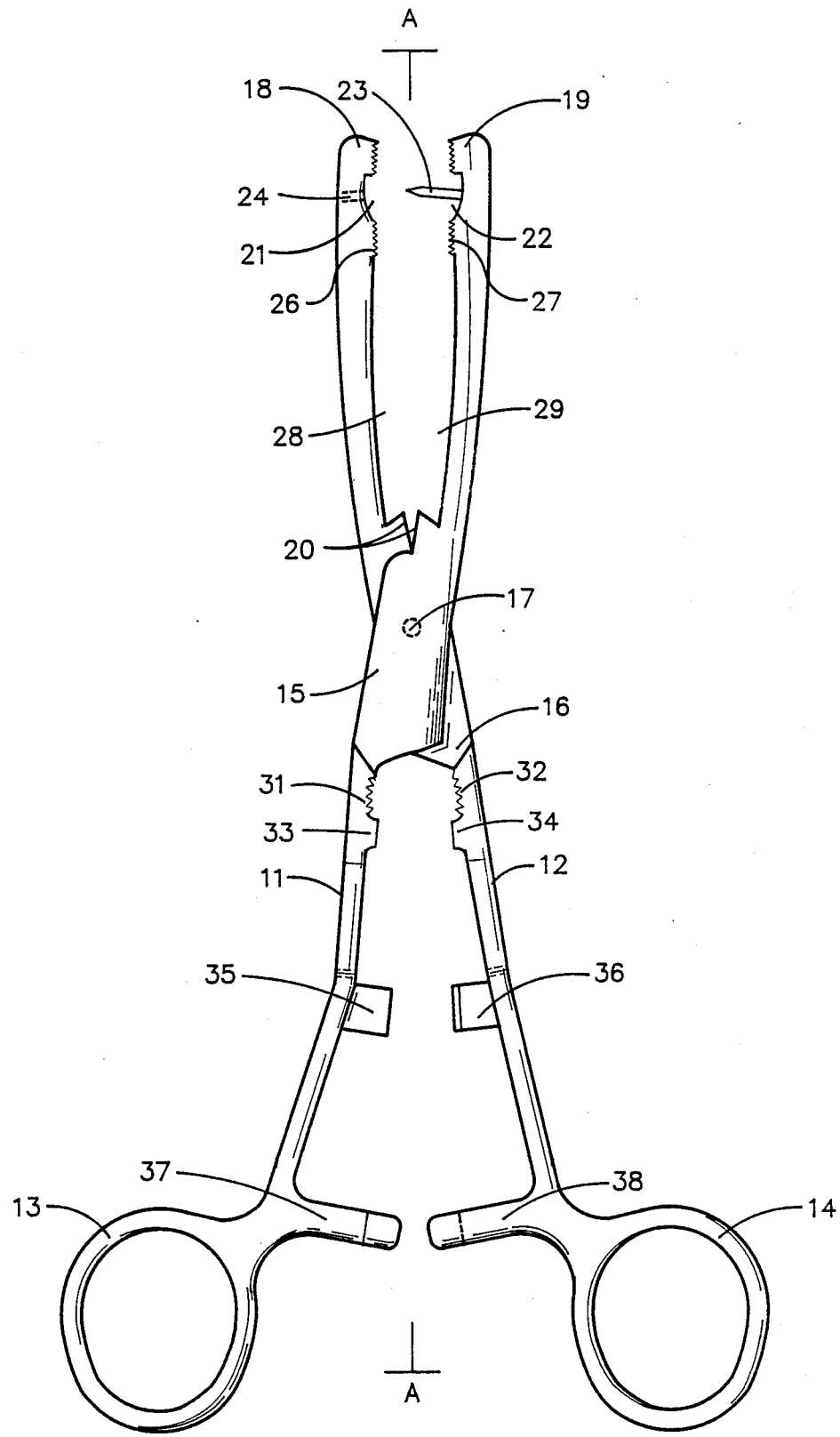
FIG. 1 is a top view of a preferred tool embodiment.
Figure 2:
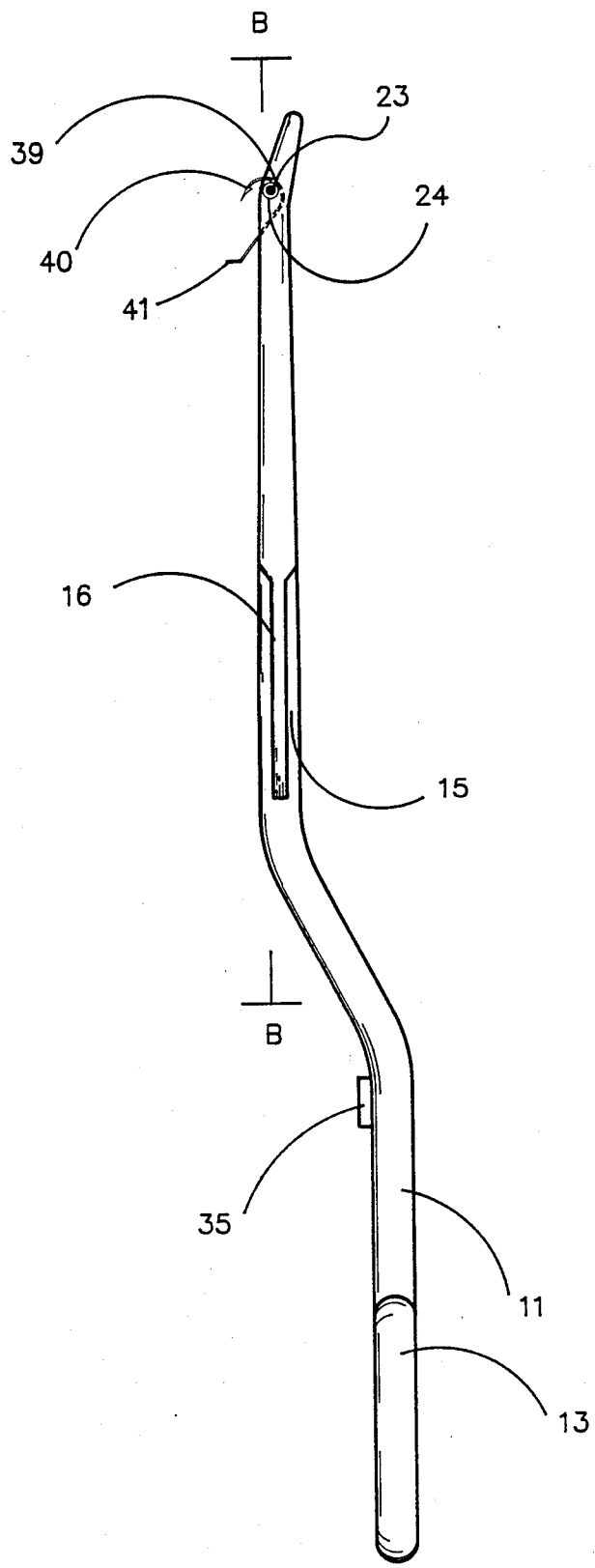
FIG. 2 is a side view of the same tool showing a small hook in place.

The fishing tool of FIGS. 1 and 2 is a modified hemostat and is made up of, on one end, handles 11 and 12 with finger loops 13 and 14 for holding and controlling the tool. The handles 11 and 12 are flattened at shaped sections 15 and 16 where one is superposed on the other and rotate around a pivot point 17 formed by a screw or rivet which acts as a fulcrum allowing inward pressure on finger loops 13 and 14 to apply an inward pressure toward center line A—A on, inter alia, the toothed tips 18 and 19 making up the jaws at the other end of the tool. As seen in FIG. 2, the tips 18 and 19 are angled, preferably at about 15°, to facilitate hook removal. The anterior edges 20 of shaped sections 15 and 16 have sharpened edges for cutting wire leader.

Adjacent tips 18 and 19 are cavities 21 and 22 with no teeth. The cavities 21 and 22 provide a space for containing a hook with minimal or no lateral pressure on the hook. A hook retainer pin 23 extends from a position below the midplane B—B (See FIG. 2) of the body of the tool toward a mating groove 24 also positioned below the midplane B—B of the body of the tool. It is preferable that the pin 23 be below midplane B—B of the tool because hook retaining pins within or above midplane B—B appear to do more damage to the flesh where smaller hooks are used. A second pair of toothed sections 26 and 27 also make contact when finger loops 13 and 14 are pressed inwardly. A second pair of cavities 28 and 29 have no teeth and provide space for the hook shank when tips 18 and 19 are pressed together. A third pair of non-contacting, toothed sections 31 and 32 are next to flattened and shaped sections 15 and 16. A pair of flat-edged extensions 33 and 34 are positioned to the rear of toothed sections 31 and 32, respectively. A pair of extensions 35 and 36, with a flat and a sharpened edge, respectively, are welded to handles 11 and 12 (See FIG. 1) at a distance from extensions 33 and 34. The locking elements 37 and 38 are positioned adjacent to finger loops 13 and 14. Locking elements 37 and 38 each have one inwardly facing tooth which locks the tool at a predetermined closure pressure.

To utilize the tool of FIGS. 1 and 2 as a hook extractor, the toothed tips 18 and 19 are opened so that hook retainer pin 23 can be slipped around hook 39 so that the barb 40 and eye 41 are below the tool and the curve (See FIG. 2) rests on the hook extractor pin 23 below midplane B—B of the tool. The tool is then pushed away from the user in a plane substantially parallel to the surface of the flesh or other material in which the hook is imbedded.

When the tool is to be used as a split shot plier, the shot is placed around a line and between toothed sections 31 and 32. Finger loops 13 and 14 are then pressed inwardly. Fishing line is readily gripped or cut with minimum damage by placing the line between the sharpened edges of extensions 35 and 36, respectively, and pressing finger loops 13 and 14 inwardly. A split shot can be opened by placing the cut side adjacent extension 36 and pressing it against the flat edge of extension 35 by pressing finger loops 13 and 14 inwardly toward the lateral center line.

Figure 3:
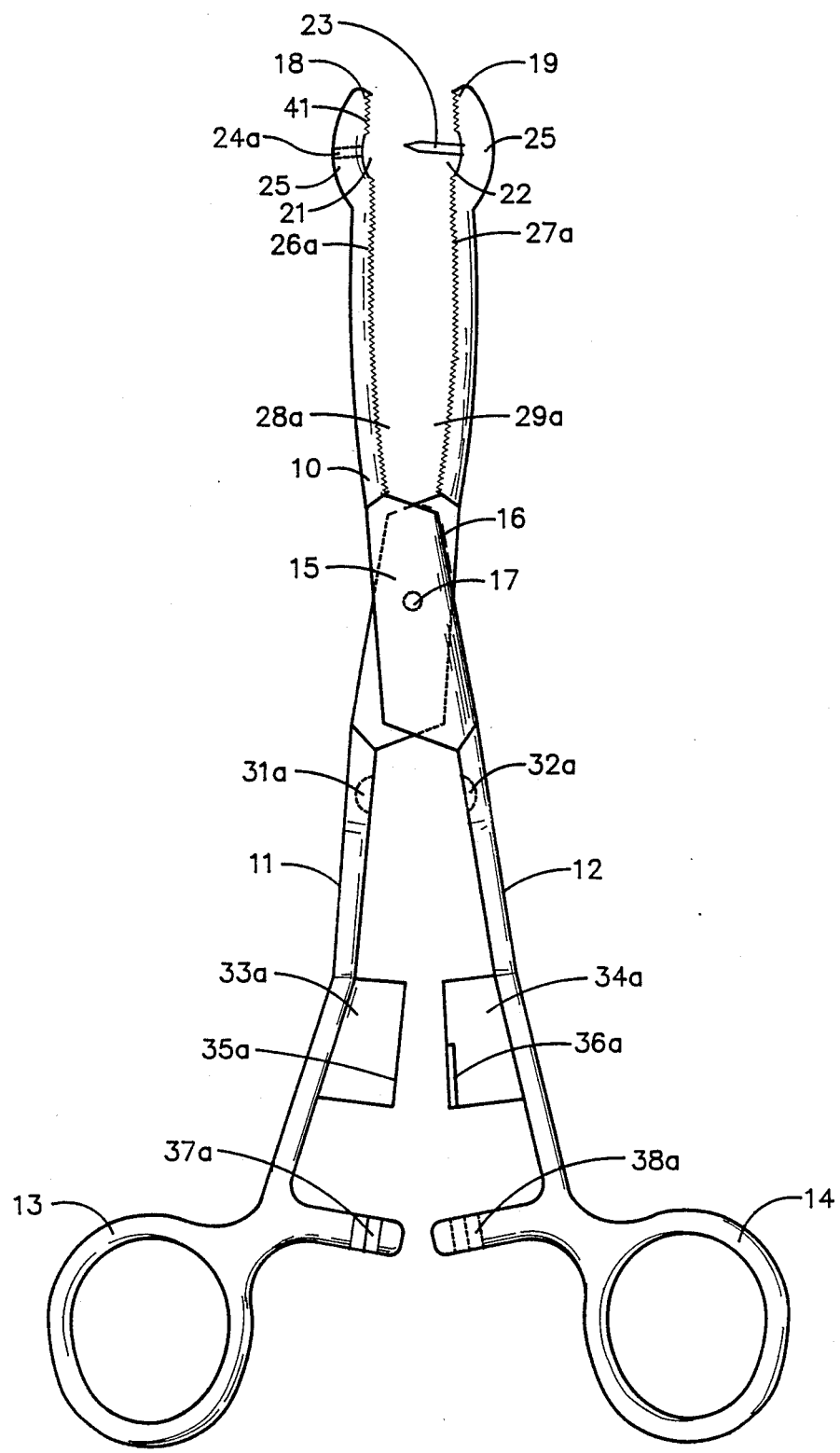
FIG. 3 shows a second preferred tool embodiment.

FIG. 3 is a second embodiment of a tool of this invention. Its numbering is the same as that of FIGS. 1 and 2 with the exception that alternative designs have a lower case "a" to designate the differences. Additional numbers are utilized where an equivalent element is not present in FIGS. 1 and 2. Rather than having a groove 24 (FIG. 1), a hole 24a is utilized. The area from the tips to the extensions 25 extend laterally and downwardly from the lateral and bottom surfaces of the tips of tool. The extensions 25 have a hook retaining pin 23 and hole 24a positioned below the mid-point between the top and bottom of the tool jaw form an elongated space for the shanks of larger hooks. Toothed sections 26a and 27a extend the entire length of the second cavities 28a and 29a. Split shot are placed around a line and the shot placed in one of cavities 31a and 32a prior to pressing finger loops 13 and 14 inwardly to compress the shot around the line. The extensions 33 and 34 and the extensions 35 and 26 of FIG. 1 are combined in this embodiment as sections 33a and 34a and sections 35a and 36a of a single extension. Section 36a has a sharpened edge. Locking elements 37a and 38a have multiple inwardly facing teeth to permit several degrees of pressure to be maintained on tips 18 and 19.

Figure 4:
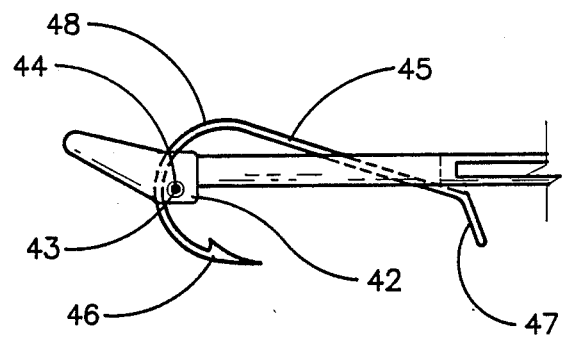
FIG. 4 is a side view of a tool with a large hook in position for removal.

FIG. 4 depicts a side view of a tool where the extensions 42 (only one shown) are angular. The tip of pin 43 is shown positioned within a hole 44. A large hook 45 is shown with a portion of the hook and barb 46 and eye 47 below the tool and pin 43 is well down on curve 48 of the hook 45.

Figure 5:
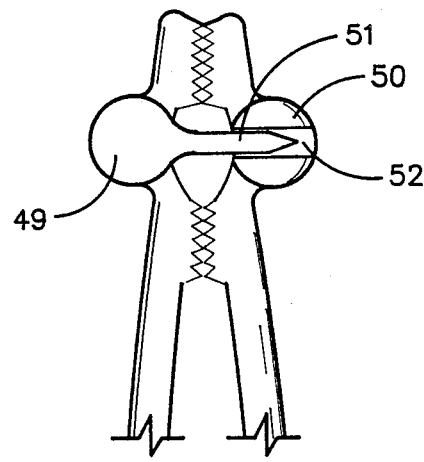
FIG. 5 is a view of the bottom of the tip of another embodiment of a tool.

FIG. 5 views a tool embodiment with rounded extensions 49 and 50 from the bottom to more plainly show that in 51 is positioned in a preferred groove 52 in extension 50.

Figure 6:
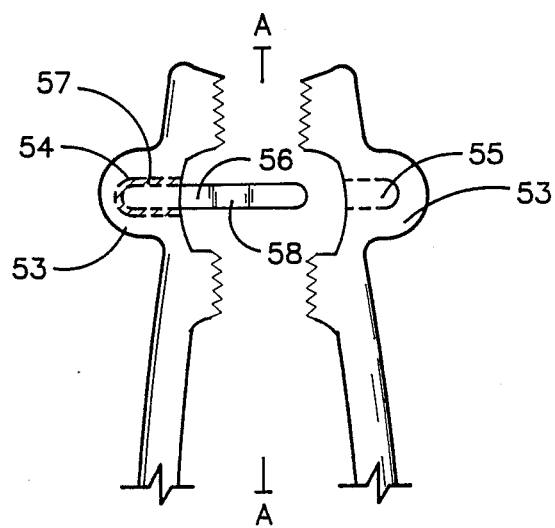
FIG. 6 depicts a tool tip with a "U" shaped pin and tip which utilizes a hole rather than a groove for anchoring the hook retaining pin.

FIG. 6 depicts a top view of another modified hemostat tip where rounded extensions 53 have holes 54 and 55 drilled into their inner surfaces. One end of hook retaining pin 56 is welded (zone 57) into hole 54 and has a "U" bend 58 (which is perpendicular to centerline A—A) at approximately its center. When the tool is in the "closed position, the tip of pin 56 projects into hole 55.

GENERAL DESCRIPTION OF THE INVENTION

The tools of this invention are made from the same quality of metals as hemostats and similar tools, preferably stainless steel and chrome or nickel plated tempered steel. Various parts can be of plastic or plastic coated, e.g., the handles. The tool can be made in different lengths for different size hooks. The length of the tools can vary but the hook sizes for which the tool is designed will determine the width and the length of the anterior or first space and the more rearward second space. The spaces must be wide enough to permit rotation of the hook with minimal friction and narrow enough to ensure that the eye of the hook will not rise above the bottom of the hook during extraction. The second space should be long enough to allow the hook retainer pin to ride well down into the curve of the hook as shown in FIG. 4. A six inch tool which can be used to easily extract hooks with sizes ranging from 18 or 16 to 5/0. A six inch tool should have a first space of about 3/32 inch wide and about ¼ inch long. In a six inch tool, the pin can be made of tempered steel and have a diameter of about 1/32 inch. Smaller and larger tools can be used with smaller and larger hooks, respectively. While the use of the tool in hook extraction is described in terms of simple hooks, the tool also works well with the multiple hooks, e.g. treble hooks. It also decreases rehooking problems. The tool is preferably used as a hook extractor and in the position depicted in FIGS. 2 and 4, because the material in which the hook is embedded suffers greater ripping if the tool position is reversed or the tool is turned over during use.

The hook retainer pin must be strong enough to withstand the forces acting on the pin without bending and is of stainless steel. One or more parts of the tool can be made of plastic for floatation or other purposes. The base of the hook retaining pin can be attached by welding, compression, etc. The tip of the hook retaining pin should extend into and seat in an anchoring mechanism which can be a groove, hole, or other equivalent. The thickness of the pin depends almost entirely on the strength of the material from which it is constructed. The hook retaining pin can be used as an awl and to clean the eyes of hooks.

There should be contact by the tool jaws at the toothed tips and at a second more medial point, as indicated in the Figures, to ensure that the eye of the hook does not rotate upwardly though the more rearward space. The distance between these points of contact will determine, in part, the size of hook that can be used.

The toothed tip and hook retaining pin thickness is governed by the strength of the material from which the tool is constructed. The lateral and vertical thickness of the toothed tips will increase as the strength of the tool material decreases and the designated hook size increases. This thickening is insurance against bending which leads to a shorter tool life. The configuration and dimensions of the tool are the same as hemostats of about the same length with the exceptions shown in the figures.

The description of this invention and claims are not intended to be limiting. The Figures are illustrative and are not exact. Thus, while the various line cutting and holding sections are shown as acting along line A—A, a single, sharp or flat-edged extension, can extend across the entire distance between the handles. Similarly, a shot crimp, cutter or vice can be positioned in any sequence between the handles and one or more of these elements can even be placed anterior (nearer the tips than the finger loops) to the shaped sections. Finally, the sharp edges can extend from either side of the inner surfaces of the tool. These and other embodiments obvious to those skilled in the art are intended to be included within the scope of the claims.

Now having described the invention, what is claimed is:

1. In a hemostat adapted for activities associated with fishing, the improvement comprising:
    (a) a first space between the jaws of the hemostat clamp section and along the centerline of the hemostat of a width which permits rotation with minimal friction of hooks of predetermined size held around a hook retaining pin;
    (b) a second, longer and more rearward space, and
    (c) a hook retaining pin adapted to extend across the first space and into an anchoring means, said pin being substantially perpendicular to the center line of the hemostat.

2. The hemostat of claim 1 wherein a space on the inner surfaces of the hemostat adjacent to the pivot section is adapted for crimping split shot.

3. The hemostat of claim 1 having at least one sharpened cutting extension means adapted to cut fishing line when the handles are forced toward the center line.

4. The hemostat of claim 1 having at least one extension means adapted for crimping shot.

5. The hemostat of claim 1 wherein a space adapted for crimping split shot is formed on the inner surfaces of the handles rearward of and adjacent to the pivot section and wherein sharpened cutting extensions between and adjacent to the handles of the hemostat are adapted to cut fishing line when the handles are forced inwardly by a user.

6. The hemostat of claim 1 wherein a space adapted for crimping split shot is positioned on the inner surfaces of the handles rearward of and adjacent to the pivot section.

7. The hemostat of claim 1 having extensions, with flat edges, positioned on the inner surfaces of the handle rearward of the space adapted for crimping shot.

8. The hemostat of claim 1 having at least one sharpened cutting extension between and adjacent to the handles of the hemostat adapted to cut fishing line when the handles are forced inwardly by a user.

9. The hemostat of claim 1 wherein at least one extension, with a flat edge, is formed on the inner surfaces of the handle rearward of the space adapted for crimping shot.

10. A hemostat having finger loop means, handle means, a pivot point and a clamping section adapted for activities associated with fishing, comprising:
   a clamping section having on its inner surface a first jaw means adjacent the tips of the hemostat,
   a second jaw means rearward of and spaced apart from the first jaw means,
   a first space means between the first and second jaw means, and
   a second space means between the second jaw means and the pivot point, and
   a handle means including finger loops.

11. The hemostat of claim 10 wherein a space on the inner surfaces of the hemostat adjacent to the pivot section is adapted for crimping split shot.

12. The hemostat of claim 10 having at least one sharpened cutting extension means adapted to cut fishing line when the handles are forced toward the center line.

13. The hemostat of claim 10 having at least one extension means adapted for crimping shot.

14. The hemostat of claim 10 wherein a space adapted for crimping split shot is formed on the inner surfaces of the handles rearward of and adjacent to the pivot section and wherein sharpened cutting extensions between and adjacent to the handles of the hemostat are adapted to cut fishing line when the handles are forced inwardly by a user.

15. The hemostat of claim 10 wherein a space adapted for crimping split shot is positioned on the inner surfaces of the handles rearward of and adjacent to the pivot section.

16. The hemostat of claim 10 having extensions, with flat edges, positioned on the inner surfaces of the handle rearward of the space adapted for crimping shot.

17. The hemostat of claim 10 having at least one sharpened cutting extension between and adjacent to the handles of the hemostat adapted to cut fishing line when the handles are forced inwardly by a user.

18. The hemostat of claim 10 wherein at least one extension, with a flat edge, is formed on the inner surfaces of the handle rearward of the space adapted for crimping shot.

* * * * *